United States Patent [19]  [11] Patent Number: 4,564,387
Ghatas et al.  [45] Date of Patent: Jan. 14, 1986

[54] WET ZINC DUST ATOMIZATION AND DISTRIBUTION

[75] Inventors: Nassef E. Ghatas, Valleyfield; John G. Peacey, Pointe Claire, both of Canada

[73] Assignee: Brunswick Mining and Smelting Corporation Limited, Bathurst, Canada

[21] Appl. No.: 494,310

[22] Filed: May 13, 1983

[30] Foreign Application Priority Data

Aug. 10, 1982 [CA] Canada ................................. 409129

[51] Int. Cl.⁴ ............................................. C22B 19/00
[52] U.S. Cl. ................................. 75/0.5 A; 75/0.5 B; 75/0.5 C; 75/109; 75/120; 75/86; 75/251; 423/101; 23/293 A; 419/23
[58] Field of Search ............. 75/0.5 BA, 0.5 A, 0.5 B, 75/0.5 C, 120, 109, 251, 86; 23/293 A; 423/101; 419/29, 23; 241/17, 23, 5

[56] References Cited

U.S. PATENT DOCUMENTS

| 3,325,277 | 6/1967 | Huseby | 75/0.5 BA |
| 3,900,309 | 8/1975 | Chao et al. | 75/0.5 BA |
| 4,124,377 | 11/1978 | Larson | 75/0.5 C |
| 4,168,970 | 9/1979 | Ghatas | 75/109 |
| 4,385,929 | 5/1983 | Ichidate et al. | 75/0.5 C |

OTHER PUBLICATIONS

Dunkley, J. J., "The Production of Metal Powders by Water Atomization" Powder Metallurgy International vol. 10, No. 1, 1978.

Primary Examiner—John Doll
Assistant Examiner—Robert L. Stoll
Attorney, Agent, or Firm—Fleit, Jacobson, Cohn & Price

[57] ABSTRACT

A method for producing and distributing wet zinc dust to a zinc sulfate purification system or other zinc plant operation is disclosed. The method comprises atomizing molten zinc with high pressure water or other suitable medium, and feeding a predetermined amount of the wet zinc dust to at least one zinc sulphate purification tank or any other zinc plant operation.

4 Claims, 3 Drawing Figures

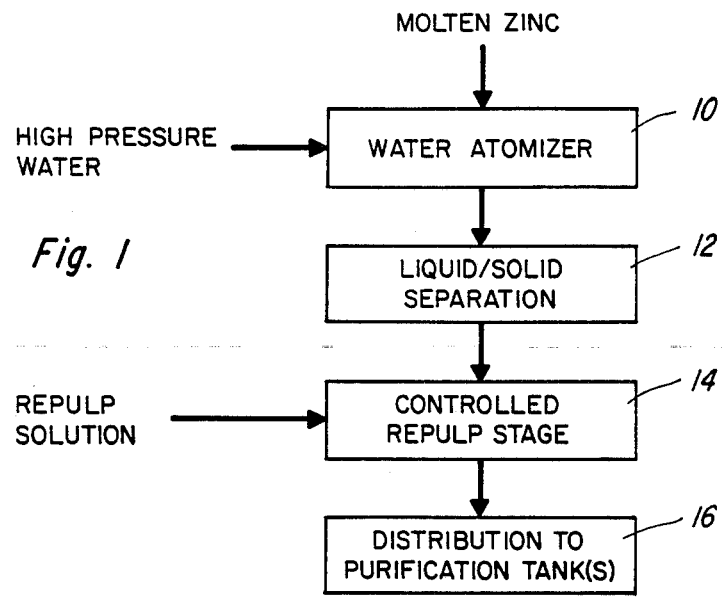
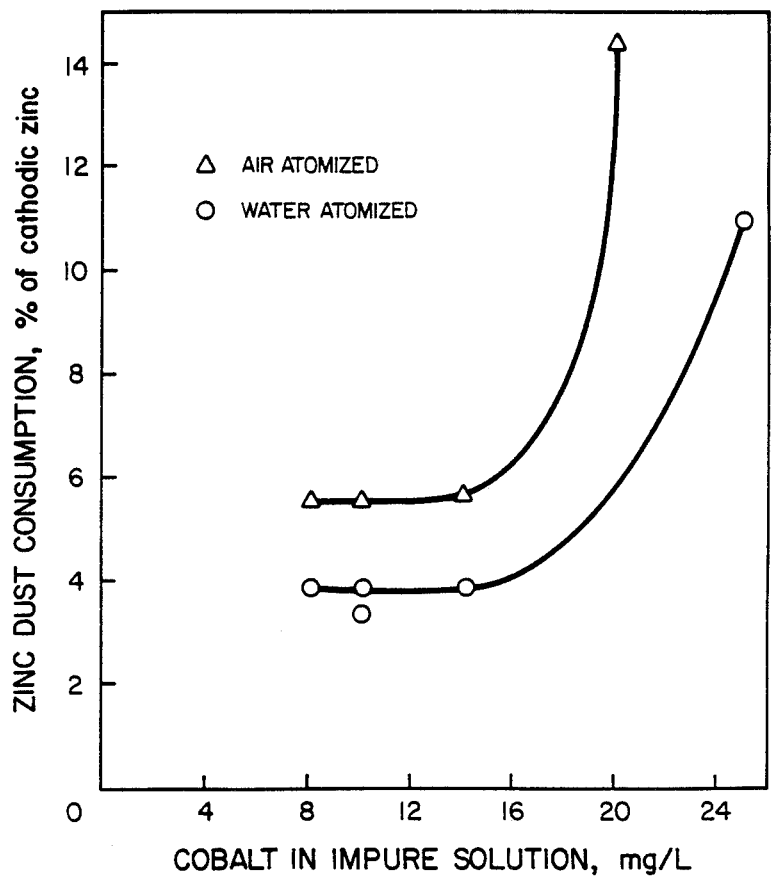
Fig. 3

WET ZINC DUST ATOMIZATION AND DISTRIBUTION

This invention relates to zinc dust atomization and distribution for use in zinc plant operations, such as the purification of zinc sulfate solutions and cadmium sponging.

In zinc plant operations, the zinc concentrate is normally roasted and the calcine subsequently leached with sulfuric acid. The zinc sulfate solution so produced is first purified by oxidation and hydrolysis to eliminate iron and other hydrolysable impurities, and further treated to eliminate impurities such as copper, cadmium and cobalt, prior to being subjected to electrolysis for recovering zinc. Purification of the zinc sulfate solution to remove copper, cadmium and cobalt ions is generally effected by cementation on zinc dust. A detailed description of one such purification process is found in U.S. Pat. No. 4,168,970 issued Sept. 25, 1979.

The efficiency of the cementation process is greatly dependent on the activity of the zinc dust used for cementation which in turn is a function of its morphology and composition. Presently, zinc dust is produced by an air atomization technique.

However, the efficiency of the air atomized technique to produce fine zinc dust is limited and as a result high consumption rates are required to effect an acceptable removal of impurities. In addition, the handling of air atomized zinc dust in the purification presents a dusting problem and a risk of explosion.

It is therefore the object of the present invention to provide an improved method and system for producing and distriburing zinc dust for use in zinc plant operations.

Applicant has surprisingly found, in accordance with the present invention, that wet zinc dust produced by atomization with high pressure water or any other suitable liquid medium exhibits a greater activity than that obtained by conventional air atomization techniques. It is believed that the greater efficiency of liquid atomized zinc dust is due to its smaller mean particle size as compared to air atomized zinc dust resulting in a larger surface area per unit weight. In addition, liquid atomized zinc dust is more active than air atomized zinc dust because the particles have a larger surface area than the air atomized dust particles due to their very irregular shapes.

The method for producing and distributing wet zinc dust to a zinc sulfate purification system or any other zinc plant operation comprises atomizing molten zinc with high pressure water or a suitable liquid medium, and feeding a predetermined amount of the wet zinc dust to at least one zinc sulfate purification tank or any other zinc plant operation. When it is desired to remove the excess liquid medium to maintain the water balance in the plant, the zinc dust from the atomizer is discharged into a liquid/solid separator to remove excess liquid and the heavy slurry so produced is repulped with a suitable solution to form a dilute zinc dust slurry containing a predetermined percentage of zinc dust.

The repulp solution may be a purified, partially purified or even an impure zinc sulfate solution depending on the zinc plant operation.

The molten zinc may contain minor amounts of other alloying elements such as lead, cadmium, aluminum, copper, iron, etc.

A preferred wet zinc dust atomization and distribution system comprises means for atomizing molten zinc or a suitable zinc alloy with high pressure water or a suitable liquid medium, and means for feeding a predetermined amount of the wet zinc dust to at least one zinc sulfate purification tank or any other zinc plant operation. If it is desired to remove the excess liquid medium, to maintain the water balance in the plant, means may be provided for removing excess liquid from the so produced zinc dust and to repulp the heavy slurry so produced so as to form a dilute slurry containing a predetermined concentration of zinc dust particles.

The zinc dust slurry is preferably continuously circulated and predetermined amounts introduced into the purification tank or tanks or other zinc plant operations.

The invention will be disclosed, by way of example, with reference to the accompanying drawings in which:

FIG. 1 is a water atomization flowsheet for producing and distributing water atomized zinc dust to purification tanks;

FIG. 3 is a comparative graph illustrating the consumption of air atomized and water atomized zinc dust as a function of concentration of Co impurities in an impure zinc sulfate solution.

Figure 2:
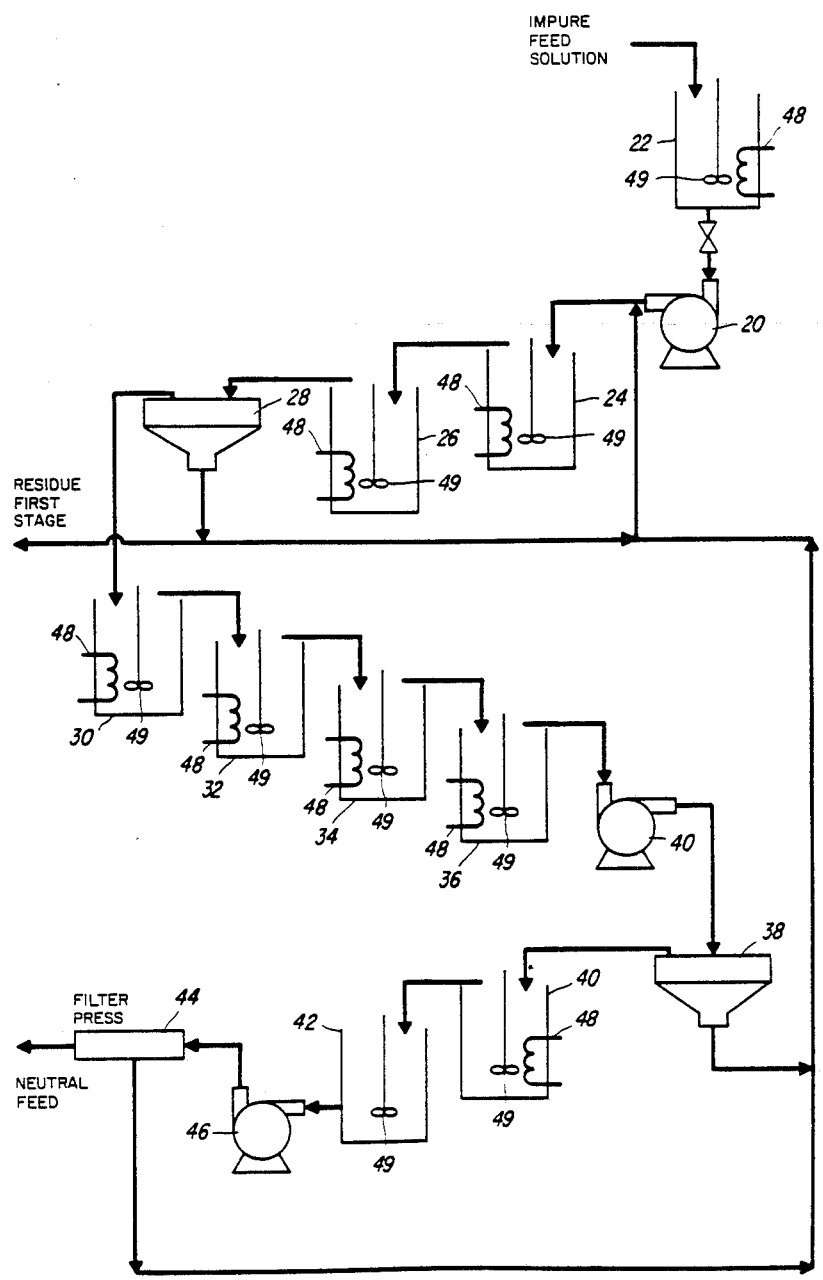
FIG. 2 is a block diagram of a pilot plant purification system used to carry out tests under conditions closely simulating the plant operation at Canadian Electrolytic Zinc, Quebec, Canada.

Tests carried out with a D-75 water atomizer manufactured by Davy-Loewy Ltd have shown that it can reliably produce fine zinc dust using high pressure water in the range of 1500 to 3000 psi, molten zinc flowrates in the range of 40–60 kg/min, and a water/metal weight ratio in excess of 2:1. Water pressure of about 2000 psi and a water/metal weight ratio in the range of 3 to 4:1 are preferred. A comparison of the above water atomized zinc dust particles with the air atomized zinc dust particles normally used at Canadian Electrolytic Zinc, Quebec, Canada has revealed that the water atomized zinc dust particles are finer (80–90% passing 100 mesh) than the air atomized zinc dust particles (65–80% passing 100 mesh), resulting in zinc dust particles having a larger surface area per unit weight.

It was also found that the water atomized zinc particles have a larger surface area which is due to their very irregular surfaces. For example, a water atomized zinc dust (90% minus 100 mesh) had twice the specific surface area of an air atomized zinc dust (85% minus 100 mesh). Of course, other water atomizers capable of producing zinc dust of comparable quality can also be used.

Referring to FIG. 1 of the drawings, there is shown a preferred schematic flowsheet of a water atomization and distribution circuit. The system is provided with at least one water atomizer unit 10 capable of producing zinc dust with a minimum of 70% preferably 90% passing 100 mesh at a rate of at least 3.5 metric tons per hour with continuous operation. A liquid zinc stream at a temperature of 450° C.–500° C. is atomized by high pressure water jets in the atomizer unit at a water to metal weight ratio in the preferred range of 3 to 4:1. The liquid zinc feed to the atomizer may be a zinc alloy containing lead, cadmium, aluminum, copper, iron, etc. For zinc sulfate purification, the liquid zinc feed is preferably a zinc alloy containing 0.5 to 2% lead by weight. In order to minimize their impact on the environment, modern electrolytic zinc plants are designed to run with a very tight water balance, producing a minimum of liquid effluents. To control the water balance in the plant, the water atomized zinc dust produced by atomizer 10 is fed by means of a pump or by gravity to a liquid/solid separation stage 12 which may consist of classifiers, densifiers, clarifiers, thickeners, decanters or filters to remove excess water from the water atomized zinc dust. The liquid/solid separation stage is preferably carried out using a classifier/densifier equipped with means to recover the settled zinc dust as a heavy slurry containing about 20% water. The excess water from the liquid/solid separation stage may be used for washing in other sections of the plant or sent to waste. Zinc dust sludge is discharged from the liquid/solid separation stage and fed into a controlled repulp stage 14 preferably a batch tank wherein a zinc dust slurry of predetermined density is produced by mixing with a repulp solution, such as a purified, a partly purified or even an impure zinc sulfate solution depending on the zinc plant operation. The repulped zinc dust slurry is then distributed to the purification tank or tanks as indicated by distribution stage 16. The slurry is preferably continuously recirculated through a distribution loop from which it is metered into the proper location in the plant. It is to be understood that other equivalent wet zinc dust atomization and distribution flowsheets are envisaged and that the above is shown as an example only. For example, if the water balance is not critical the water atomized zinc dust produced by atomizer 10 may be fed directly to the distribution stage 16. Furthermore, the water atomized zinc dust so produced can be used in any zinc plant operation, which uses zinc dust to cement the impurities.

Pilot plant purification tests were carried out under continuous operating conditions closely simulating the plant operation at Canadian Electrolytic Zinc, Quebec, Canada, to evaluate the efficiency of the water atomized zinc dust. Similar tests were also conducted using the air atomized zinc dust as produced at Canadian Electrolytic Zinc, Quebec, Canada to enable a comparison of the efficiency of both types of zinc dusts.

Impure feed solution (about 50 m$^3$ from the plant was stored in a 150 m$^3$ tank and was used during the two series of purification tests. This arrangement rendered possible the utilisation of the same quality of impure feed for both tests. The mean composition of the impure feed solution treated during these tests was 150 gpl Zn, 0.54 gpl Cu, 24 mgpl Co and 0.77 gpl Cd.

The purification system comprised three purification stages including a total of seven tanks (80 liters in volume per tank) as shown in FIG. 2. The impure feed solution was pumped through the system by a pump 20 connected to a holding tank 22, at a flow rate of 2 liters/min resulting in a residence time of 40 min. per tank. The first stage purification was simulated using two tanks 24 and 26 arranged in cascade where the copper and cadmium impurities together with about 70% of the cobalt were cemented onto the recycled purification residue (about 90% unreacted zinc) from the second and third stages. Following the first stage purification, the solution was directed towards a thickener 28 to separate out a solid residue containing the copper, cadmium and about 70% of cobalt. About 50% of such residue was sent to further treatment to recover copper and cadmium and the rest recycled back to the first tank 24. The overflow solution from the thickener 28 was then treated in a second purification stage containing four tanks 30, 32, 34 and 36 arranged in cascade for removal of the cobalt impurity. This process was effected by cementation onto zinc dust added to the first tank 30 (about 70%) and to the third tank 34 (about 30%). Antimony trioxide (1.7 mg/l) was added to the first tank 30. The solution containing the purification residue was directed towards a thickener 38 by a pump 40 to separate out the solids. The overflow from the thickener was finally treated in a third stage including purification tank 40 to remove any traces of impurities. This stage was effected by addition of zinc dust. The solution contained in tank 40 overflowed into a holding tank 42 and was subsequently pumped into a filter press 44 by a pump 46 and the filtrate was analyzed for various elements, i.e., copper, cadmium, cobalt. The underflow from the second stage thickener 38 together with the solids from the filter press 44 were recycled to the first tank 24 of the first stage. The tanks were maintained at a desired temperature by electric heaters 48. Stirrers 49 were also provided for stirring the solution in the tanks. A detailed description of the operating conditions prevailing during these tests is shown in the following Table I. The sizing of the two types of zinc dust utilized during these tests was 76.3% passing 100 mesh for the air atomized zinc dust and 86.4% passing 100 mesh for the water atomized zinc dust.

TABLE I

| EXPERIMENTAL CONDITIONS | ZINC DUST AIR ATOMIZED (1% Pb) | ZINC DUST WATER ATOMIZED (1% Pb) |
| --- | --- | --- |
| IMPURE SOLUTION | | |
| flow (l/min) | 2.0 | 2.0 |
| Density | 1.380 | 1.380 |
| Co$^{++}$ mg/l | 25 | 25 |
| RETENTION TIME: | | |
| 1st STAGE (min) | 80 | 80 |
| Thickener #1 (min) | 100 | 100 |
| 2nd STAGE (min) | 160 | 160 |
| Thickener #2 (min) | 100 | 100 |
| 3rd STAGE (min) | 40 | 40 |
| Total (h) | 8 | 8 |
| TEMPERATURE | | |
| 1st STAGE | 70 ± 2° C. | 70 ± 2° C. |
| 2nd STAGE | 98 ± 2° C. | 98 ± 2° C. |
| 3rd STAGE | 98 ± 2° C. | 98 ± 2° C. |
| pH | | |
| 2nd STAGE | 3.85 ± .15 1st reservoir | no control (4.2) |
| 3rd STAGE | 3.85 ± .15 | 3.85 ± .15 |
| Sb$_2$O$_3$ at 1st reservoir of second stage (mg/l) | 2 | 2 |
| RECYCLING OF SOLIDS | | |
| thickener 1st STAGE | 50% to the 1st stage | 50% to the 1st stage |
| thickener 2nd STAGE | 600 ml/min to the 1st stage | 600 ml/min to the 1st stage |
| filter-press | 4 l/h to the 1st stage | 4 l/h to the 1st stage |

Typical results of the pilot plant scale purification tests using various quantities of zinc dust are shown in Table 2 for the air atomized zinc dust and in Table 3 for the water atomized zinc dust.

TABLE 2

| Stage | Zn° Dust (g/l) | Zn° Dust (%) | Sb₂O₃ (mg/l) | Electrolyte (Ml/l) | pH | T (°C.) | SG SLN impure | Recycling to stage I Thick. #1 (g/l) | Recycling to stage I Thick. #2 (g/l) | Recycling to stage I Press (g/l) | SOLUTION Cu Quant. (mg/l) | SOLUTION Cd Quant. (mg/l) | SOLUTION Co Quant. (mg/l) | RESIDUE Nz (%) | RESIDUE Cu (%) | RESIDUE Cd (%) |
|---|---|---|---|---|---|---|---|---|---|---|---|---|---|---|---|---|
| I | — | — | — | — | — | 70 | 1.380 | 3.5 | 27.0 | 0.3 | — | 1000 | 25.5 | 34.4 | 9.8 | 6.6 |
| II | 6.3 | 8.2 | 1.8 | 25 | 3.87 | 96 | — | — | — | — | — | 8.9 | .35 | — | — | — |
| III | 0.9 | | — | — | 3.93 | 85 | — | — | — | — | — | 13.6 | 2.1* | — | — | — |
| I | — | | — | — | — | 69 | 1.370 | 0.8 | 5.2 | 0.5 | n/d | 860 | 23.1 | — | — | — |
| II | 7.0 | 9.8 | 1.8 | 38 | 3.91 | 99 | — | — | — | — | — | 7.5 | .73 | — | — | — |
| III | 1.3 | | — | — | 4.1 | 98 | — | — | — | — | — | 25.9 | 2.0* | — | — | — |
| I | — | | — | — | — | 71 | 1.378 | 1.7 | 0.5 | 0.1 | n/d | 1200 | 32.5 | 25.3 | 26.3 | 12.1 |
| II | 8.4 | 11.6 | 1.8 | 35 | 3.84 | 96 | — | — | — | — | — | 0.9 | .32 | — | — | — |
| III | 1.0 | | — | — | 3.87 | 95 | — | — | — | — | — | 3.9 | 4.1* | — | — | — |
| I | — | | — | — | — | 71.3 | 1.406 | 0.5 | 5.0 | 0.4 | n/d | 730 | 21.5 | n/d | n/d | n/d |
| II | 8.9 | 12.5 | 1.7 | 60 | 3.92 | 96.8 | — | — | — | — | — | 6.8 | .31 | — | — | — |
| III | 1.1 | | — | — | 3.89 | 97.2 | — | — | — | — | — | 4.0 | .77* | — | — | — |
| I | — | | — | — | — | 67.8 | 1.400 | 1.0 | 13.7 | 0.8 | n/d | 900 | 18.9 | — | — | — |
| II | 10.2 | 14.1 | 1.8 | 1.0 | 3.79 | 95.6 | — | — | — | — | — | 13.9 | .20 | — | — | — |
| III | 0.8 | | — | — | 4.07 | 92 | — | — | — | — | — | 18.8 | .98* | — | — | — |
| I | — | | — | — | — | 70.8 | 1.400 | 1.8 | 13.8 | 0.8 | n/d | 1500 | 27.3 | — | — | — |
| II | 10.6 | 14.8 | 1.8 | 1.0 | 4.00 | 96.4 | — | — | — | — | — | 6.9 | .22 | — | — | — |
| III | 0.8 | | — | — | 4.08 | 96 | — | — | — | — | — | 14.2 | 1.2* | — | — | — |
| I | — | | — | — | — | 70.1 | 1.400 | 1.7 | 15.2 | 0.1 | n/d | 1400 | 24.6 | 35.9 | 18.7 | 8.5 |
| II | 10.2 | 14.0 | 1.7 | 1.0 | 3.8 | 96.2 | — | — | — | — | — | 9.6 | .16 | — | — | — |
| III | 0.7 | | — | — | 3.9 | 93 | — | — | — | — | — | 14.9 | .80* | — | — | — | n/d = non determined
*cobalt redissolved in stage III

TABLE 3

| Stage | Zn° Dust (g/l) | Zn° Dust (%) | Sb₂O₃ (mg/l) | Electrolyte (Ml/l) | pH | T (°C.) | SG SLN impure | Recycling to stage I Thick. #1 (g/l) | Recycling to stage I Thick. #2 (g/l) | Recycling to stage I Press (g/l) | SOLUTION Cu Quant. (mg/l) | SOLUTION Cd Quant. (mg/l) | SOLUTION Co Quant. (mg/l) | RESIDUE Nz (%) | RESIDUE Cu (%) | RESIDUE Cd (%) |
|---|---|---|---|---|---|---|---|---|---|---|---|---|---|---|---|---|
| I | — | — | — | — | — | 68 | 1.385 | 1.4 | 6.4 | 1.5 | <1.0 | 970 | 21.2 | 44.9 | 3.4 | 2.8 |
| II | 5.3 | 6.5 | 1.7 | 2.1 | 3.94 | 97 | — | — | — | — | — | 24.1 | 2.2 | — | — | — |
| III | 0.9 | | — | — | 3.87 | 95 | — | — | — | — | — | 7.4 | .60 | — | — | — |
| I | — | | — | — | — | 74 | 1.385 | 1.6 | 7.5 | 1.5 | <1.0 | 1100 | 22.3 | 44.9 | 3.4 | 2.8 |
| II | 5.7 | 7.3 | 1.7 | 2.1 | 4.04 | 96 | — | — | — | — | — | 14.2 | .40 | — | — | — |
| III | 1.0 | | — | — | 3.92 | 95 | — | — | — | — | — | 4.4 | .48 | — | — | — |
| I | — | | — | — | — | 70 | 1.392 | 1.2 | 2.2 | 0.9 | n/d | 56.0 | 8.9 | n/d | n/d | n/d |
| II | 6.7 | 9.5 | 1.7 | 2.1 | 3.94 | 95 | — | — | — | — | — | .4 | .10 | — | — | — |
| III | 1.4 | | — | — | 3.98 | 95 | — | — | — | — | — | 3.2 | .54 | — | — | — |
| I | — | | — | — | — | 72 | 1.395 | 2.4 | 5.4 | 0.4 | n/d | 50.2 | 10.4 | 29.4 | 10.6 | 8.0 |
| II | 6.8 | 9.8 | 1.8 | 4.2 | 4.25 | 96 | — | — | — | — | — | .4 | .12 | — | — | — |
| III | 1.5 | — | — | — | 3.89 | 91 | — | — | — | — | — | .4 | .17 | — | — | — |
| I | — | | — | — | — | 70 | 1.395 | 2.0 | 5.8 | 0.4 | n/d | 77.9 | 9.3 | 29.4 | 10.6 | 8.0 |
| II | 6.3 | 8.4 | 1.7 | 4.2 | 4.28 | 96 | — | — | — | — | — | .4 | .13 | — | — | — |
| III | 1.1 | | — | — | 3.84 | 95 | — | — | — | — | — | .6 | .33 | — | — | — |
| I | — | — | — | — | — | 68 | 1.377 | n/d | 6.0 | 0.7 | n/d | 830 | 10.1 | 39.7 | 2.2 | 3.3 |
| II | 7.5 | 9.8 | 1.7 | 2.1 | 4.18 | 96 | — | — | — | — | — | 1.3 | .10 | — | — | — |
| III | 0.8 | | — | — | 3.77 | 94 | — | — | — | — | — | 1.4 | .10 | — | — | — |

Analysis of these data based on the frequency of tests attaining a residual concentration below 0.2 mg/l has revealed that a consumption of water atomized zinc dust equivalent to 9.5% of the production of cathodic zinc is required to obtain the same degree of purification as that obtained with a consumption of air atomized zinc dust equivalent to 14.3% of the cathodic zinc production. This represents a saving of about 33% in the zinc dust consumption. It has also been found that this saving in zinc dust is valid for a range of cobalt concentrations in the impure feed solution as shown in FIG. 3 by the substantially constant spacing of the two curves. These results were obtained from separate pilot plant tests using impure zinc sulfate solutions containing about 10 mg/l, 14 mg/l, 20 mg/l and 24 mg/l cobalt in solution.

We claim:

1. A method for forming from molten zinc a slurry having a concentration of zinc dust suitable for use in purifying zinc-containing solutions for electrolytic zinc plant operations, said method comprising the steps of:

(a) atomizing molten zinc into a slurry with a high pressure aqueous medium at a pressure higher than 1000 psi so as to produce zinc dust particles having a particle size of at least 70% passing 100 mesh and a surface area of irregular shape, said surface area being substantially larger per unit weight than the surface area of substantially spherical particles of the same particle size;

(b) performing a liquid/solid separation on the slurry for removing water from the zinc dust slurry to concentrate the slurry so that the water balance in the plant is controlled; and (c) adding a zinc sulfate solution to said concentrated slurry to dilute said concentrated slurry at said concentration of zinc dust suitable for introduction into said electrolytic zinc plant operation.

2. A method as defined in claim 1, wherein said zinc sulfate solution is a purified, partially purified or impure zinc sulfate solution.

3. A method as defined in claim 1, wherein the molten zinc is a zinc alloy containing other metals such as lead, copper, cadmium, aluminum and iron.

4. A method as defined in claim 1, wherein the water-to-metal weight ratio is in the range of 3 to 4:1.

* * * * *